United States Patent [19]

Messner

[11] Patent Number: 5,015,421
[45] Date of Patent: May 14, 1991

[54] DIFFUSION DEVICE

[75] Inventor: Rudolf Messner, Adelsdorf, Fed. Rep. of Germany

[73] Assignee: Parkson Corporation, Fort Lauderdale, Fla.

[21] Appl. No.: 366,606

[22] Filed: Jun. 15, 1989

[30] Foreign Application Priority Data

Jun. 20, 1988 [DE] Fed. Rep. of Germany ... 8807929[U]

[51] Int. Cl.$^5$ ............................................. B01F 3/04
[52] U.S. Cl. ................................. 261/122; 248/231.8; 160/380; 160/402
[58] Field of Search ............ 261/122; 248/231.8; 160/380, 402, 399

[56] References Cited

U.S. PATENT DOCUMENTS

| 299,359 | 5/1884 | Doty | 160/402 |
|---|---|---|---|
| 1,250,376 | 12/1917 | Starbuck et al. | 160/380 |
| 1,792,286 | 2/1931 | Curry et al. | 261/122 |
| 1,873,843 | 8/1932 | MacDonald | 261/122 |
| 2,978,234 | 4/1961 | Lamb | 261/122 |
| 3,058,518 | 10/1962 | Housman | 160/402 |
| 3,529,653 | 9/1970 | Fey, Jr. | 160/402 |
| 4,234,035 | 11/1980 | Babbs | 160/402 |
| 4,382,867 | 5/1983 | Schmit et al. | 261/122 |
| 4,410,027 | 10/1983 | Lucous | 160/380 |
| 4,422,983 | 12/1983 | Bardo et al. | 261/111 |
| 4,569,805 | 2/1986 | Hume et al. | 261/122 |
| 4,624,781 | 11/1986 | Messner | 261/122 |
| 4,631,134 | 12/1986 | Schussler | 261/122 |
| 4,658,522 | 4/1987 | Kramer | 160/402 |
| 4,842,779 | 6/1989 | Jager | 261/122 |

FOREIGN PATENT DOCUMENTS

0229386  7/1987  European Pat. Off. ............ 261/122

Primary Examiner—Tim Miles
Attorney, Agent, or Firm—Brumbaugh, Graves, Donohue & Raymond

[57] ABSTRACT

In the representative embodiments of diffusion devices disclosed in the specification, a diffusor support member and a flexible sheet-like diffusor are connected in sealing relation along peripheral edges by continuous clamping and sealing arrangements. One form of the clamping and sealing arrangement comprises a U-shaped clamp which embraces the edge of the support member and the peripheral edge of the diffusor. In another form of clamping and sealing arrangement, two strip members held apart by a third strip are inserted into a groove in the support member so as to clamp the diffusor in the groove. Additional strengthening members for the support member and hold-down members for the diffusor are also disclosed.

14 Claims, 5 Drawing Sheets

DIFFUSION DEVICE

BACKGROUND OF THE INVENTION

This invention relates to diffusion devices for aerating water with small bubbles using a diffusor element arranged over a solid plate-type support element and, more particularly, to such diffusors having fastening devices to connect the diffusor with the support element along the outer edges in such a way that a seal is maintained and, at the same time, the fastening device is removable. The diffusor element contains holes and, when little or no air is supplied, the diffusor element rests tightly on at least one surface of the support element.

The Messner U.S. Pat. No. 4,624,781 describes an air distribution device for aeration of water with small bubbles, especially in biological wastewater treatment plants. This air diffusion device consists of a solid plate and a perforated air diffusion membrane. The edges of the membrane are joined to the solid plate by peripheral strips fastened to the plate to provide for a peripheral seal. The design also has strips within the area of the membrane which are fastened to the solid plate. The solid plate typically is made of plastic or asbestos cement and the sealing strips are made of plastic.

The edge strips which function as sealing elements are necessary to provide a gas-tight connection between the membrane and the solid plate support around the periphery. When the diffusion element has a large area, such as about 1 by 4 meters, the pressure of the gas beneath the diffusor exerts large forces on the connections between the support member and the diffusor. The connection between these edge strips (and sometimes also the other strips) and the membrane with the solid plate is made by self-tapping screws or rivets which penetrate the diffusion member and may weaken it in the region of the screws or rivets. U.S. Pat. No. 4,624,781 also suggests that brackets may be spaced around the edges, to clamp the edge strips and the solid plate together with the membrane between them, but such brackets do not assure a satisfactory seal in the intervals between them. It is also suggested that the brackets may be connected to the solid plate by screws or rivets. In addition, it is known that, for systems which consist of two membranes or a membrane and a plate, a peripheral connection may be accomplished by vulcanizing or using adhesives.

The type of connection between the solid plate, the membrane and edge strips described in U.S. Pat. No. 4,624,781, which also functions as a peripheral seal, is relatively complex with respect to materials, manufacturing and assembly and uncertain in effectiveness. It is, therefore, not a solution which is satisfactory in all respects. In addition, connections between a diffusor and a plate which provide seals by vulcanization or using adhesives are in many cases not possible because the materials used are undesirable for other reasons.

SUMMARY OF THE INVENTION

Accordingly, it is an object of the present invention to provide a new and improved air diffusion device which overcomes the above-mentioned disadvantages of the prior art.

Another object of the invention is to provide a diffusion device which has a simple peripheral seal between a diffusing member and a support member which is especially effective for diffusors having a large area.

These and other objects of the invention are attained by providing a diffusion device including a sheet-like diffusing member, a support member having a surface arranged to support the diffusing member, and a peripheral sealing arrangement including continuous resilient clamping elements engaging the peripheries of the sheet-like diffusing member and the support member to clamp the diffusing member to the periphery of the support member to resiliently retain them in gas-tight sealing relation. The peripheral sealing arrangement requires relatively minor manufacturing and assembly resources and so that installation, as well as disassembly and maintenance, especially if accompanied by an exchange of diffusor, can be quick and simple and at the same time provides a very good gas-tight sealing function. A hold-down member for retaining a portion of the diffusing member adjacent to the support member surface when a gas is introduced between the diffusing member and the support member may also be provided.

In a preferred embodiment, the diffusing member is a flexible perforated membrane and the peripheral sealing arrangement includes at least one continuous resilient clamp and sealing arrangement for each of the longest edge portions of the support member. The shape of the clamping and sealing element is made in such a way that it accomplishes both a clamping and sealing connection between the edge portions of the flexible membrane or sheet and the corresponding edge portions of the support member.

According to one arrangement of the preferred embodiment, the continuous clamping and sealing arrangement has essentially a U-shape and is made as a clamp-fit edge sealing strip or strips or as an edge bar or bars which serve to grip and clamp the upper and lower circumferential surfaces of the support member which are covered by peripheral portions of the diffusor. Another arrangement has continuous clamping and sealing elements which are designed to engage a corresponding groove recessed in the edge of the support member so that the corresponding peripheral portion of the diffusor is retained either wholly or in part in the groove. In these cases, the continuous peripheral clamping arrangement forms both a fastening and a sealing connection so that, if there is an increasing pull on this clamping connection, for example, because of the gas pressure between the diffusor and the support, then the desired clamping action is enhanced in an advantageous way.

For specific applications of the invention, there is an exceptionally favorable further design according to the invention. In this case, the arrangement is like an assembly kit which has at least two continuous clamping and sealing members for each edge portion. These members are superimposed and engage both the upper and lower surfaces of the support member to clamp the diffusor between the support member and the sealing elements with two or more continuous superimposed clamping and sealing members, resulting in an especially favorable strengthening of the clamping effect.

There are also cases in which the support member has relatively low strength so that the cost to manufacture a specially modified continuous clamping and sealing member is prohibitive. To accommodate that situation, a further embodiment of the invention provides at least one edge-strengthening member to strengthen the edge region of the support member. In that way, the edge region of the support member is provided with the necessary strength to accept a standard clamping and sealing member. In this case, the continuous clamping and sealing member is designed to encompass at least in part the edge-strengthening member together with the edge portion of the diffusor folded over the edge-strengthening member. This arrangement permits the use of identical standardized continuous clamping and sealing members for support members having different thicknesses.

Another embodiment of the invention provides the specific advantage of a clamp fit profile sealing element having a U-shape with legs of unequal length in which the shorter leg engages the edge region of the membrane and assures that an increase in gas or air pressure does not cause the U-profile to be opened up. Since the shorter leg has a smaller surface area then the other leg, the effect of the clamping and sealing connection is fully maintained at the same time.

A further embodiment makes it possible to maintain a sealing and clamping effect in the corner regions of the diffusion device. In this case, the clamping and sealing elements have projecting extensions in the corner regions which mesh with each other and therefore permit perpendicular sealing clamps.

Another arrangement has diffusor hold-down and strengthening members which prevent ballooning of the diffusor when gas is applied and also reinforce the support member. In addition, the separate hold-down and reinforcing members may comprise self-supporting strips.

If high pulling forces on the diffusor member are anticipated, the support member and/or the continuous clamping and sealing members and/or the edge-strengthening member can be provided with surface grooves or ridges to increase the friction and/or the local pressures in the clamping region. To increase the friction as well as to improve the cohesive forces, the engaging surfaces may be treated in any conventional manner to enhance the stickiness or adhesion of the diffusor to the support member.

In another arrangement according to the invention, the members which are arranged over the diffusor to hold it down and the reinforcing elements which strengthen the support member can be installed at the same time as the clamping and sealing members. In other words, the members which keep the diffusor down and/or the reinforcing elements do not have to be mounted by screws or rivets. In addition, the construction in this case is very simple so that the resulting diffusion device can be quickly manufactured in different sizes and therefore can be quickly adjusted to demands of different aeration basins. With these variations, especially in the form of an assembly kit, it is therefore very easy to use a selected number of clamping and sealing elements and a selected number of diffusor hold-down members and/or strengthening members together with other components and produce diffusion devices of the desired size.

It should also be mentioned that a preferred way of making the peripheral sealing arrangement of the invention, especially the clamping and sealing member, is to use fiber-reinforced plastic.

BRIEF DESCRIPTION OF THE DRAWINGS

Further objects and advantages of the invention will be apparent from a reading of the following description in conjunction with the accompanying drawings illustrating representative embodiments of the invention. In the various embodiments illustrated, the parts and elements of the same kind are represented by the same number. In the drawings.

DESCRIPTION OF PREFERRED EMBODIMENTS

Figure 1:
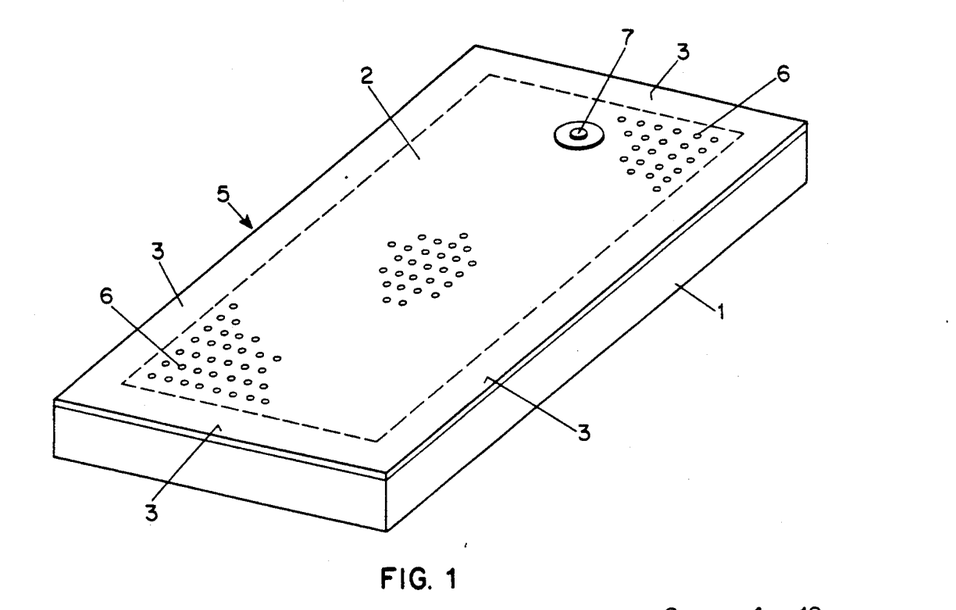
FIG. 1 is a perspective schematic view illustrating a representative embodiment of a diffusion device.

In the representative embodiment of the invention shown in FIG. 1, an air distribution device 5 consists of a solid plate-type support member 1 made, for example, from plastic, asbestos cement or similar materials. A diffusor 2 in the form of a thin flexible perforated plate or membrane is mounted on top of the support member 1.

The flexible diffusor 2 has an array of perforations 6 and an air supply connection 7 is located on the diffusor near one end of the air distribution device 5. Air, oxygen or other gases are supplied through the connection 7 to the region between the perforated diffusor 2 and the support member 1.

As indicated in FIG. 1, the flexible diffusor 2 has peripheral edge regions 3 which must be connected by sealing joints to the corresponding edge regions of the support member 1 which are disposed under the diffusor 2. The diffusion device 5 may be, for example, about 1 to 2 meters wide and 3 to 4 meters long, resulting in substantial pulling forces being applied to the connections when gas is supplied to the diffusor.

The function and operation of the air distribution device 5 shown schematically in FIG. 1 when mounted horizontally in a liquid body and pressurized with a gas are known to those skilled in the art. Bubbles which emerge from the flexible perforated diffusor of the air distribution device are uniformly distributed over the entire surface of the diffusor and have the same diameter.

Figure 2:
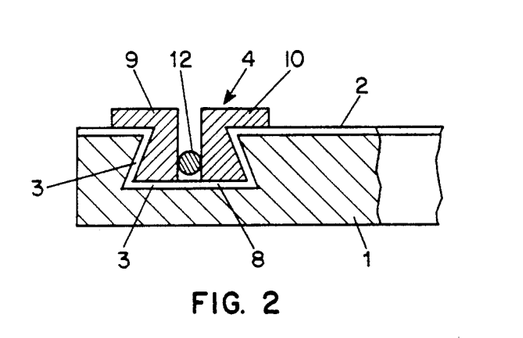
FIG. 2 is a schematic cross-sectional view showing an edge region of a support member with an adjacent flexible diffusor and a continuous clamping and sealing arrangement along the edge region according to the invention.
Figure 3:
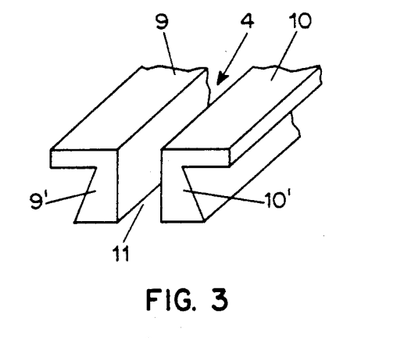
FIG. 3 is a perspective fragmentary view illustrating the continuous clamping and sealing arrangement shown in FIG. 2.

FIGS. 2 and 3 show one example of a representative fastening device which provides both a physical restraint for the diffusor and a sealing connection between edge region 3 of the flexible diffusor 2 and the corresponding edge region of the support member 1 located below the edge region of the diffusor.

The diffusor 2, which may be a perforated air distribution membrane as shown in FIG. 1, rests on the upper surface of the support member 1 when little or no air is introduced. This condition is shown in FIGS. 1 and 2. The continuous clamping and sealing arrangement which is shown in FIGS. 2 and 3 is put together like a building kit in the edge regions. This building kit consists of two separate continuous clamping and sealing members 9 and 10 and a round bar 12. The round bar 12 can be pushed into a space 11 shown in FIG. 3 between the two clamping and sealing members 9 and 10 to clamp the diffusor 2 into a groove 8 in the support member as shown in FIG. 2.

Both of the continuous clamping and sealing elements 9 and 10 have L-shaped cross-sections and have legs 9' and 10' with essentially wedge-shaped cross-sections. The groove 8 has an essentially trapezoid-shaped cross-section and is located in the edge region of the support member 1 where the sealing connection is made. The edge region 3 of the membrane 2 is first pushed down into the groove 8 and the two wedge-shaped legs 9' and 10' are then symmetrically arranged in the groove 8 so that the upper parts of the L-shaped elements 9 and 10 rest on top of the membrane 2 on both sides of the groove 8. This is shown in FIG. 2. The round bar 12 is then pushed down in the area 11 between the two legs 9' and 10' of the two continuous clamping and sealing members 9 and 10 so that the legs 9' and 10' of these members are pushed away from each other until the edge region of the membrane 2 which has been pushed into the groove previously comes into contact with the sides of the groove 8. The fastening arrangement shown in FIGS. 2 and 3 can be used for all of the edge regions 3 shown in FIG. 1. Thus, this arrangement provides a continuous clamping and simultaneously sealing connection around the entire periphery of the support plate 1.

Figure 4:
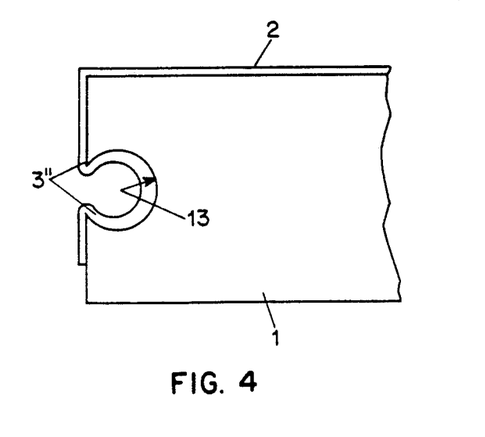
FIG. 4 is a fragmentary side view showing the support member with an adjacent flexible diffusor.
Figure 5:
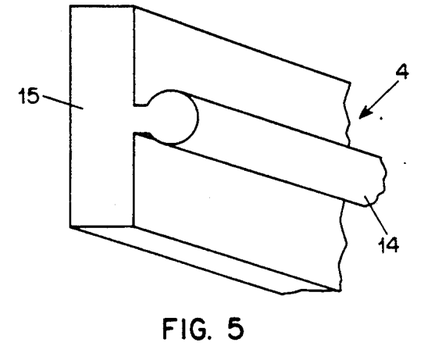
FIG. 5 is a perspective view showing a representative embodiment of a continuous clamping and sealing arrangement for use in the device shown in FIG. 4.

The example shown in FIGS. 4 and 5 provides a continuous connection in which the fastening device 4, shown in FIG. 5, consists of a clamp-fit continuous-sealing member which has the shape of a round bar 14 formed as one piece with a strip 15. To accomplish the sealing connection, the edge region 3" of the membrane 2 is introduced into a continuous clamp groove 13 which is formed in one of the edge surfaces of the support member 1 as shown in FIG. 4 and the round bar 14 is then forced into the groove.

Figure 6:
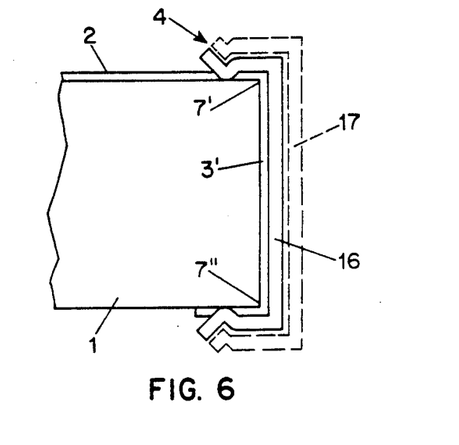
FIG. 6 is a fragmentary schematic side view illustrating another embodiment of a diffusion device including a support member, a flexible membrane, and a continuous clamping and sealing arrangement.

FIG. 6 shows an example of a continuous resilient clamping and sealing member 4 which consists of a U-shaped resilient clamp strip 16 embracing the edge of the support member 1. The flexible membrane 2 which is to be fastened around the edge region is placed around the upper and lower edges 1' and 2' of the support member 1. Both the upper surface as well as the side surface and a portion of the lower surface of the support member 1 are covered by a corresponding edge region 3' of the membrane 2. The continuous resilient clamping and sealing member 16 is pressed over this edge region 3' to create the clamping and sealing connection in such a way that the upper and lower edges 1' and 1" of the support member 1 are securely gripped.

As illustrated in dotted outline in FIG. 6, it is possible to enhance the clamping and sealing action by providing an additional continuous resilient clamping and sealing member 17 superimposed on the first clamping and sealing member 16. Thus, for example, the fastening device 4 can be supplied as a kit which consists of two or more continuous clamping and sealing members 16 and 17 which can be nested. As shown in FIG. 6, the clamping and sealing members are superimposed so that they grip each other as well as clamping and sealing the edge region 3' of the membrane 2 to the upper and lower edges 1' and 1" of the support member 1.

Figure 7:
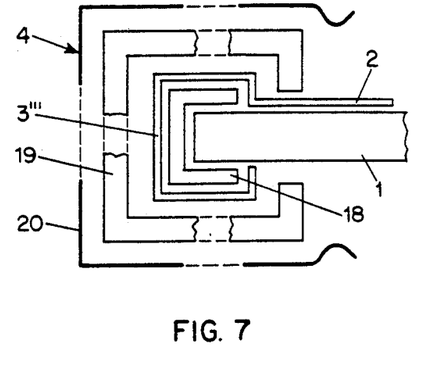
FIG. 7 is a fragmentary view showing another embodiment of a diffusion device with a continuous clamping and sealing arrangement designed as a building kit illustrated in a schematic exploded side view.
Figures 8, 9, 10, 11:
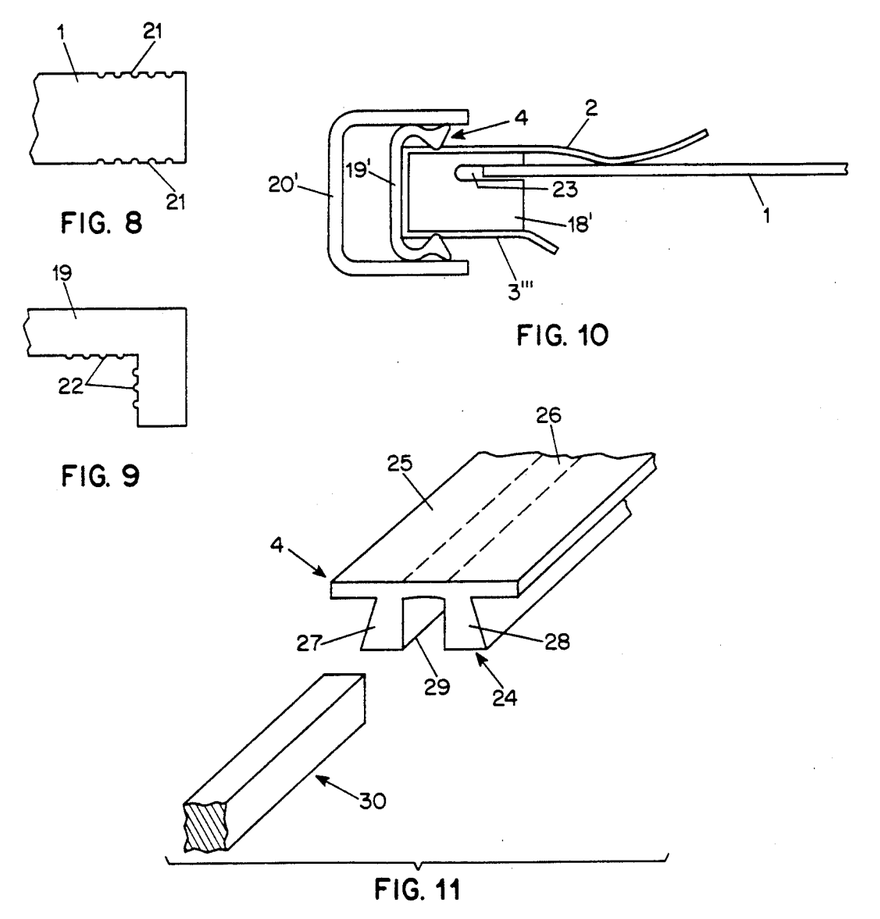
FIG. 8 is a fragmentary detailed view of the support member shown in FIG. 7.
FIG. 9 is a fragmentary detailed view of the continuous clamping and sealing arrangement shown in FIG. 7.
FIG. 10 is a schematic side view illustrating an additional example of a fastening device and an edge-strengthening member according to the invention.
FIG. 11 is a perspective fragmentary view illustrating a further example of a fastening device according to the invention.

FIGS. 7 and 10 show examples of continuous clamping and sealing arrangements which are in some respects similar to that of FIG. 6. For clarity, the arrangement in FIG. 7 has been shown in a somewhat exploded view. In FIG. 7, the clamping and sealing arrangement 4 consists of an assembly which can be supplied in kit form including two continuous clamping and sealing members 19 and 20 which are arranged on top of each other so that they grip the edge region of the support member 1. In this specific example, the support member has a relatively low strength so an additional strengthening member 18 is included which is mounted on the edge of the support member 1.

The edge region 3''' of the membrane 2 is placed or folded over the edge-strengthening member 18 in such a way that the edge region 3''' extends essentially from the upper side to the lower side of the support member 1. To create the sealing and clamping connection for this arrangement, the continuous clamping and sealing member 19 is mounted over the edge region 3''' of the membrane and the further continuous resilient clamping and sealing member 20 is mounted on the member 19.

FIG. 10 illustrates the final assembled condition of a clamping and sealing arrangement 4 with an edge-strengthening member similar to the arrangement shown in FIG. 7. In this case, an edge-strengthening member 18 is provided with a slot 23 into which the edge of a relatively thin support member 1 is inserted. Once again, the edge region 3''' of the flexible membrane 2 is folded around the support member 1 and the strengthening member 18' and a first clamping and sealing element 19' and a second clamping and sealing element 20' are then mounted in succession on the edge of the support member.

FIG. 11 shows a continuous clamping and sealing arrangement 4 which in some respects is similar to that of FIGS. 2 and 3. The arrangement 4 shown in FIG. 11 is designed as a kit which consists of a swallowtail-shaped clamping and sealing element 24 and a corresponding clamp rod 30. The clamping and sealing element 24 includes a clamp plate 25 which is provided with a flexible middle region 26. In the regions of the clamp plate 25 which are next to the middle region 26, there are wedge-shaped legs 27 and 28 extending downwards and between these a slot 29 is provided. The two legs 27 and 28 are in this case joined with the upper clamp plate 25 as one piece.

In a way similar to that shown in FIG. 2, the edge region 3 of the membrane 2 is pushed into the groove 8 and the two wedge-shaped legs 27 and 28 grip inside the trapezoid-shaped groove 8 shown in FIG. 2 to form the connection. The clamp rod 30 is then pushed lengthwise into the slot 29 and, because of the elasticity of the middle region 26, the two wedge-shaped legs 27 and 28 move away from each other and into the corresponding voids in the groove 8. This accomplishes the same simultaneous clamping and sealing connection which has already been shown in FIGS. 2 and 3.

The flexible middle region 26 of the clamping and sealing member 24 offers still another advantage. When the membrane 2 is forced away from the support member 1 by air pressure, then the clamping effect is improved in the region under the legs 27 and 28 up towards clamping plate 25, the side areas of which rest firmly against the top side of the membrane 2. The components 24 and 30 of the arrangement 4 shown in FIG. 11 are preferably made of a plastic material.

FIGS. 8 and 9 also show that, for example, the support member 1 can be provided with grooves 21 on one or more of the sealing surfaces and the clamping and sealing members, for example, the member 19 of FIG. 7, may have ridges 22 on one or more of the regions which form the sealing region. With the help of such ridges and grooves, it is possible to increase the frictional contact between the membrane and the support member and clamping members to improve the resistance to pulling forces. To further improve the retention of the membrane, an agent which improves adhesion between the surfaces can also be applied instead of or in addition to the grooves and ridges 21 and 22.

The continuous resilient clamping arrangement according to the invention provides in all cases for a secure peripheral connection between the diffusor and the support member without using screws or rivets and also assures an absolutely gas-tight or air-tight seal even under high mechanical stresses between the edge region of a flexible perforated diffusor and the corresponding edge regions of a solid support member. This effect is especially enhanced when air or gas is introduced through the connection 7 of the air distribution device 5 between the support member 1 and the diffusor 2 as is suggested in FIG. 1 and, as a result, the diffusor 2 moves away from the support member 1. In this case, the clamping effect becomes stronger with higher gas pressure which increases the stress in the area of the connection.

In addition, the fastening device according to the invention is not only applicable to air distribution devices but also, for example, for lifting tools, floats, displacement bodies and the like, i.e., whenever it is desired to have a fixed connection which at the same time provides very good sealing around the outside of the specific body.

In connection with FIG. 11, it should also be pointed out that the continuous clamping and sealing member 24 can be built in a turned-around way so that the legs 27 and 28, contrary to the arrangement shown in FIG. 11, extend upwardly. This involves modifying the groove in a corresponding way.

Figure 12:
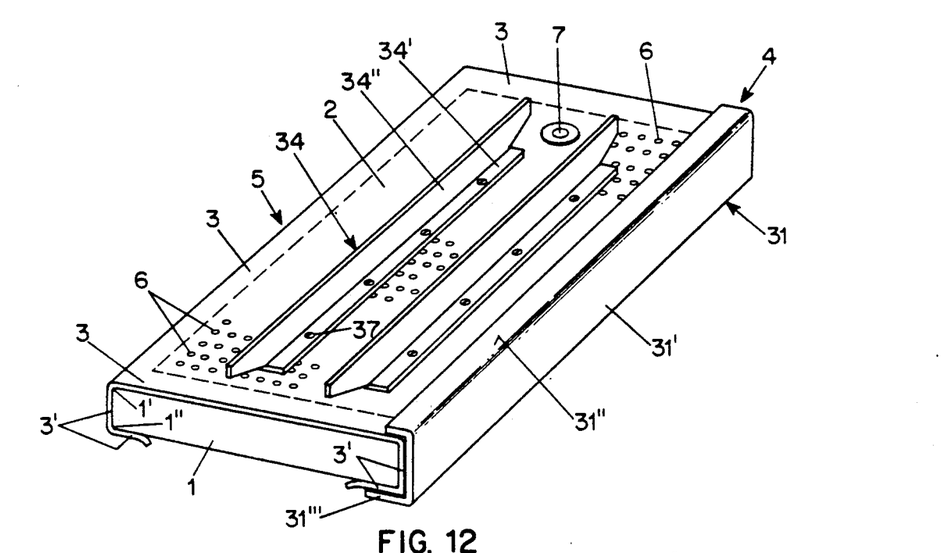
FIG. 12 is a perspective view showing a further example of a diffusion device.

The air distribution device 5 shown in FIG. 12 consists of a plate-type support member 1, made, for example, from plastic, asbestos cement or similar materials. A diffusor in the form of a flexible membrane 2 is disposed on the top surface of the support member 1 and has perforations 6 and an air supply connection 7 through which a gas such as oxygen is applied to the space between the support member 1 and the membrane 2.

Figure 13:
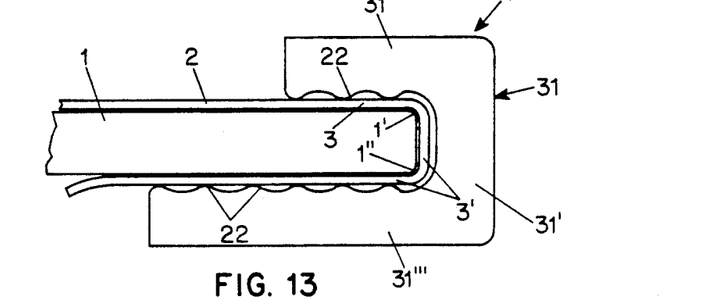
FIG. 13 is an enlarged side view of the device illustrated in FIG. 12 schematically showing the support member, the flexible diffusor and the clamping and sealing arrangement.

As indicated in FIG. 12, the flexible membrane 2 has an edge region 3 which is to be connected by sealing joints to the corresponding edge regions of the support member 1 disposed beneath the membrane. To accomplish this, FIGS. 12 and 13 illustrate a continuous fastening arrangement 4 which provide for a clamping and sealing connection between the edge regions 3 of the membrane 2 and the corresponding edge regions of the support member 1. The edge region 3 of the membrane 2 is wrapped around the upper and lower circumferential edges 1' and 1" of the support member 1 to form an edge region 3'. This edge region 3' extends inwardly along the lower surface of the support member 1 and ends in such a way that it projects out somewhat from the end of the fastening arrangement 4 as shown in FIGS. 12 and 13.

Figure 14:
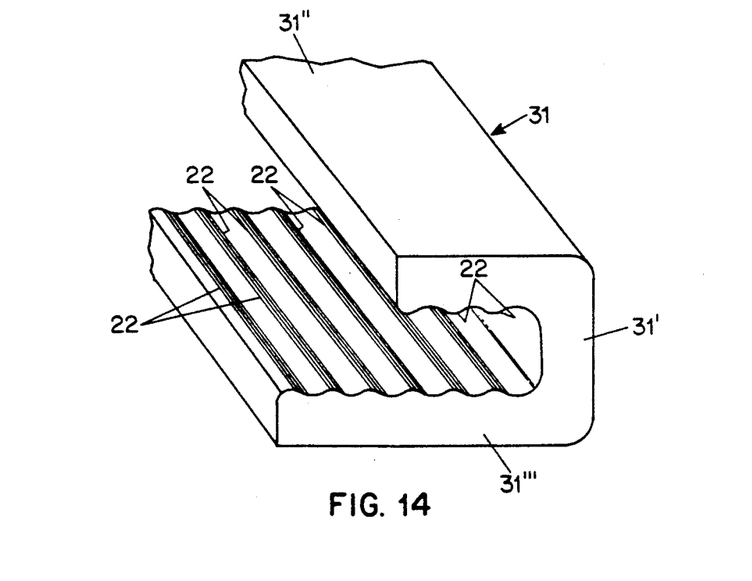
FIG. 14 is a specific fragmentary view in perspective of the clamping and sealing arrangement shown in FIG. 13.

The example which is shown in FIGS. 12-14 of the fastening arrangement 4 is characterized by a special U-shaped clamping and sealing strip 31. To form the desired clamping and sealing connection, the strip 31 is pressed onto the edge region of the membrane 2 in such a way that the two parallel shanks 31" and 31'" of the strip 31 embrace the upper and lower circumferential edges 1' and 1" of the support member 1. The shanks 31" and 31'" extend perpendicularly from a base 31' with the two shanks being of different length. In the assembled condition, the shorter shank 31" engages the edge region of the top of the support member 1 which is covered by the membrane 2. The opposite shank 31'", which is longer, engages the edge region on the bottom of the support member 1 which is covered by the edge region 3' of the membrane 2.

The support member 1 can, for example, be made from a plastic material having a thickness of 5 mm and the side edges 1' and 1" of the member may be rounded as shown in FIG. 13 to prevent the membrane 2 from being damaged. The shorter shank 31" of the U-shaped strip 31 prevents the membrane 2 from lifting or pushing away the shank 31" when the internal pressure separates the membrane from the support member.

As shown in FIGS. 13 and 14, the surfaces of the shanks 31" and 31'" of the element 31 which serve as sealing surfaces can be made with grooves 22 which will increase the friction and/or local pressures occurring along the groove lines. Although FIG. 12 shows only one clamping and sealing element along one of the sides of the air diffusion device 5, it should be understood that corresponding continuous clamping and sealing elements are affixed to the other edges of the diffusion device 5.

Figure 18:
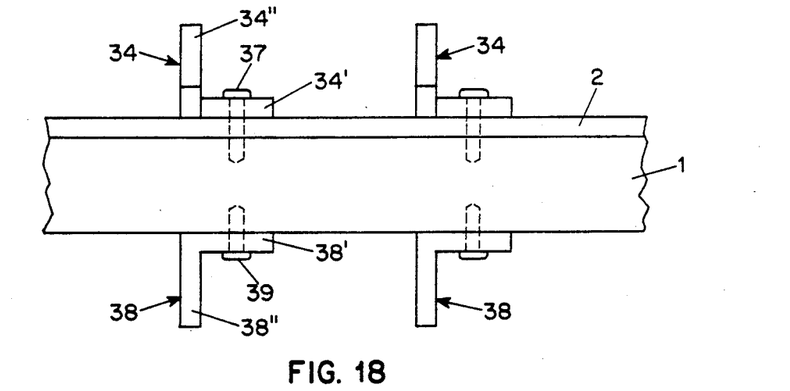
FIG. 18 is a schematic fragmentary view showing a modified diffusion device similar to that of FIG. 12.

In addition, FIG. 12 and FIG. 18 show that, to prevent the membrane from ballooning when gas is supplied to the device, a number of hold-down members 34 are provided which are oriented in the longitudinal direction of the diffusion device 5 adjacent to the top surface of the membrane 2. These hold-down members 34 have the shape of angle profiles and serve not only to keep the membrane down but also to reinforce the device which consists of the support member 1 and the membrane 2. The element 34 consists from one part 34' which extends parallel to the membrane 2 and another part 34" which extends perpendicular to the part 34'. The first part 34' of the member 34 shown in FIG. 12 is fastened to the support member 1 with screws 37, but other fastening methods, for example riveting, are also possible.

The second, vertical part 34" ends in a wedge shape 35 (see FIG. 19) with the edge 35' extending at an angle to the part 34'. The wedge shape is directed upwards and terminates in a vertical edge. This wedge-shaped end 35 of the element 34" makes it possible for the membrane to balloon in a controlled way at the end of the support member 1 which, in turn, makes it possible to assure a gas flow perpendicular to the length of the support member 1.

Figure 19:
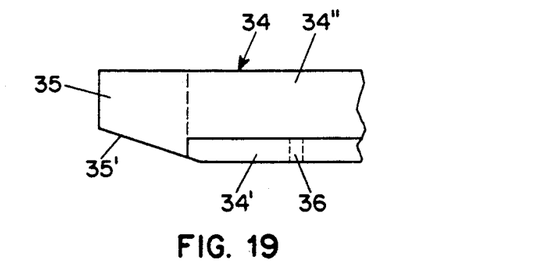
FIG. 19 is a schematic side view showing the end of one of the hold-down elements which are arranged above the diffusor in FIG. 18.

This wedge-shaped end of the part 34" of the element 34 is shown in FIG. 19, which also shows that the part 34' which is parallel to the membrane 2 may be made with holes 36 which are used for screws 37. In the embodiment shown in FIG. 18, these screws are screwed through the membrane 2 into the support member 1. In this case, because the pulling forces are the same on opposite sides of the screws, there is no tendency to tear the membrane as might occur with screws passing through the membrane along the periphery.

FIGS. 18 and 19 further show additional self-supporting strengthening members 38 which are positioned opposite to the element 34 at the lower surface of the support member 1. The strengthening members 38 are preferably made as angle profile elements. These angle profile elements or strengthening members 38 also have a part 38' parallel with the surface of the support member 1 and in this case they are also connected to the support member 1 by screws. They can obviously also be fastened in other ways, for example by riveting.

Figure 20:
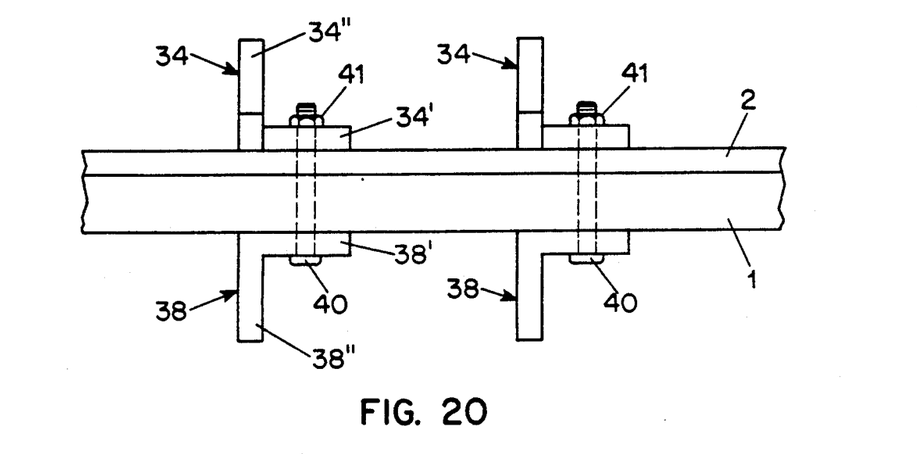
FIG. 20 is a view similar to that of FIG. 18 showing a further modified design.

FIGS. 18 and 20 also show that the members 34 and the strengthening members 38 are positioned opposite each other on the upper and lower side of the diffusion device and the vertical parts 34" and 38", respectively, are also directly opposite to each other. If the support member 1 is thin, as shown in FIG. 20, it is also possible to use bolts and nuts to join the two angled profiles 34 and 38 with each other through the support member 1 and the membrane 2. Other fastening methods, for example, riveting, are also possible.

Figure 15:
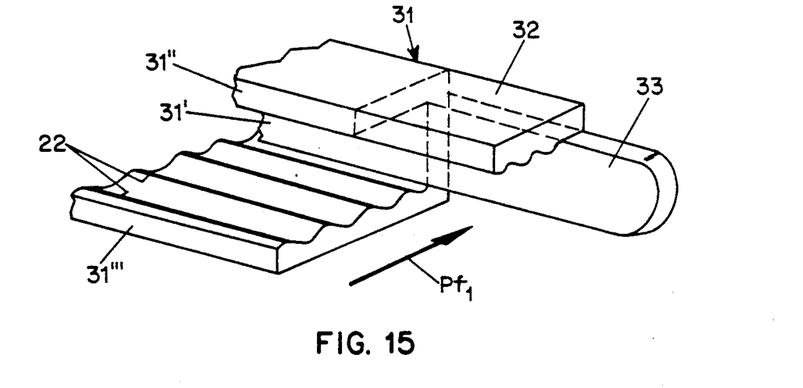
FIG. 15 is a perspective view showing the end of a clamping and sealing arrangement according to a modified design.
Figure 16:
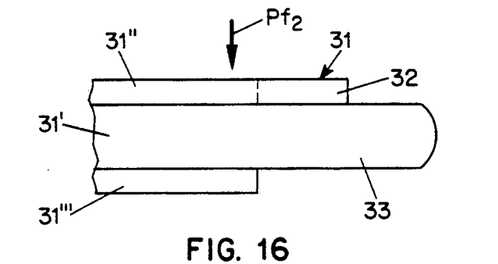
FIG. 16 is a side view of the design shown in FIG. 15 looking in the direction of the arrow Pf$_1$.
Figure 17:
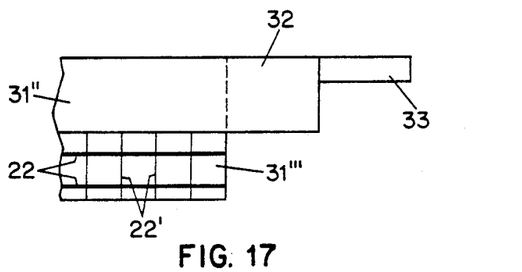
FIG. 17 is a top view of the arrangement shown in FIG. 16 looking in the direction of the arrow Pf$_2$.

FIGS. 15-17 show a design of clamping and sealing elements 31 having ends which can be meshed together so that they can be used in the corners of the diffusion device 5. FIG. 15 schematically shows one end which is equipped with two extending parts, of which one extending part 32 extends from the first shorter shank 31" of the U-profile and another extending part 33 which extends from the base strip 31' of the U-shaped member like a projecting finger in the direction of the length of the base strip. This second extending part 33 is longer than the first extending part 32 which is also shown in FIGS. 16 and 17. When the profiles are assembled in the corners of the diffusion device 5, the finger-shaped extending parts 33 fit into the grooves which are formed by the perpendicular U-shaped clamps and engage the base part 31' of the U-profile. On the other hand, the projecting first extending part 32 comes in contact with the upper shorter shank 31" of the perpendicular member. This arrangement provides a continuous clamping and sealing connection in these corner areas.

The clamping and sealing elements are preferably manufactured from fiber-reinforced plastic as has been already mentioned, with the surfaces which serve for sealing being shaped with small grooves 22. As is also shown in FIG. 17, these small grooves 22 may extend not only in the length direction, but cross-directed small grooves 22' can also be added especially when fiber-reinforced plastic is used as the material of construction.

Figure 21:
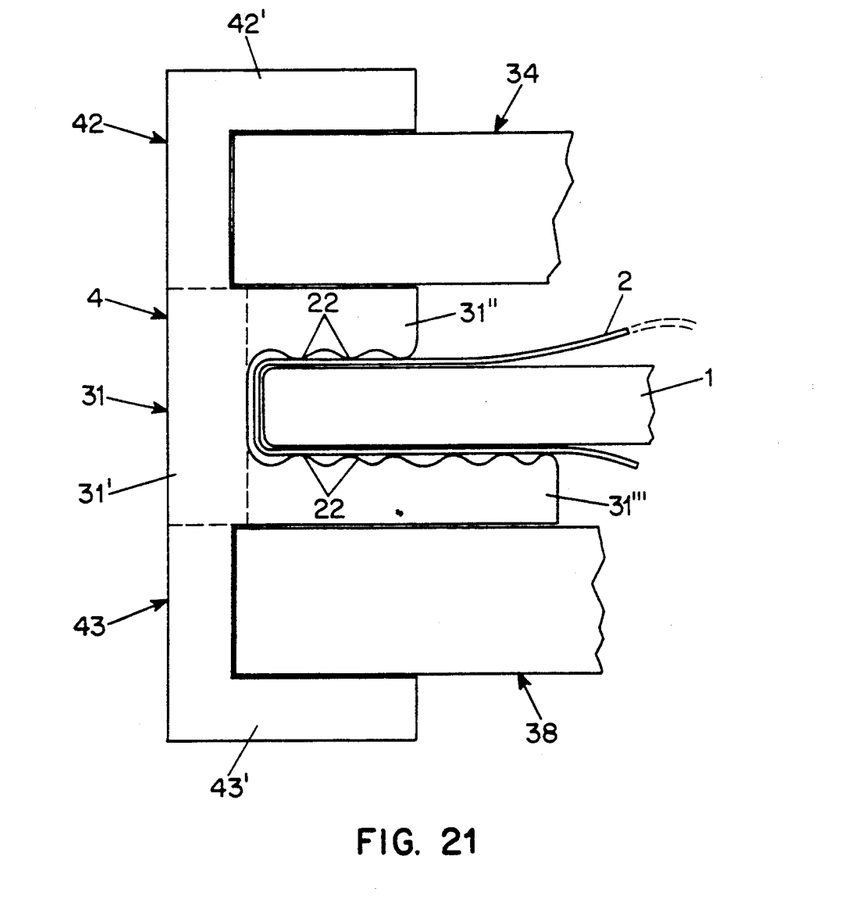
FIG. 21 is a schematic side view showing a modified design for a clamping and sealing arrangement for a diffusor device.

Finally, FIG. 21 shows another modified design of a fastening arrangement 4 which consists of a three-level U-shaped strip, i.e., in this case there are three U-profiles which have been arranged one immediately on top of the other in the vertical direction. The middle U-profile corresponds to the clamping and sealing element 31 of FIGS. 13 and 14 and above and below this clamping and sealing element 31, there are additional strip elements 42 and 43 extending from the base of the strip. Preferably, these strip elements 42 and 43 are integral with the U-profile base part 31', and this system is preferably made completely of fiber-reinforced plastic. Between the shank 31" of the clamping and sealing element 31 and the above-positioned shank 42', a first receiving groove is formed. This is used to receive an end piece of the element 34 shown in FIGS. 18 and 20.

On the opposite side, a second receiving groove is formed by the second shank 31''' of the clamping and sealing 20 element 31 and a parallel additional shank 43'. This receiving groove serves to receive an end of the reinforcing element 38 shown in FIGS. 18 and 20.

Instead of a three-level U-profile, a two-level U-profile can, of course, also be used, for example, consisting of the clamp fit profile sealing element 31 and either the upper angle profile element 42 or the lower angle profile element 43. It is also possible to provide clamping and sealing elements in the form of strips or bars 31, in which receiving grooves are formed in the two shanks 31" and 31''' to receive hold-down and strengthening elements. By providing such additional grooves in the continuous clamping and sealing arrangement, the hold-down members 34 and strengthening members 38 can be installed without requiring screws or rivets passing through the diffusor.

Although the invention has been described herein with reference to specific embodiments, many modifications and variations therein will readily occur to those skilled in the art. Accordingly, all such variations and modifications are included within the intended scope of the invention.

I claim:

1. A diffusion device comprising support means having a diffuser-supporting surface, flexible sheet-like diffuser means positioned on the support means adjacent to the supporting surface, and connecting means providing a removable, gas-tight connection between the periphery of the diffusor means and the periphery of the support means and arranged so that the diffusor means may be supported by the diffuser-supporting surface of the support means in the absence of gas pressure tending to separate the diffuser means from the support means, wherein the connecting means comprises continuous resilient clamping and sealing means engaging peripheral regions of the diffusor means and the support means to resiliently retain them in gas-tight sealing engagement along the periphery of the diffusor means and diffusor-retaining means for retaining the diffusor means adjacent to the diffusor-supporting surface at a location within the region defined by the periphery of the diffusor means and the support means to inhibit excessive separation of the diffusor means from the diffusor-supporting surface, wherein the diffusor-retaining means comprises at least one hold-down member disposed adjacent to the surface of the diffusor means within the periphery of the device, and U-shaped strip means embracing opposed edges of the support means and having L-shaped portions providing opposed grooves to receive the opposite ends of the hold-down member.

2. A diffusion device according to claim 1 wherein the clamping and sealing means comprises at least two nesting clamping strips to embrace the upper and lower edges of the support means and the peripheral region of the diffusor means.

3. A diffusion device according to claim 1 including strengthening strip means for strengthening the support means and wherein the clamping and sealing means encloses at least a portion of the strengthening means.

4. A diffusion device according to claim 1 wherein the hold-down member is designed to serve as a reinforcing member with respect to the support means and also to hold the diffusor means against the support means.

5. A diffusion device according to claim 1 wherein the continuous resilient clamping means is made out of fiberglass-reinforced plastic.

6. A diffusion device according to claim 1 wherein the hold-down member has an L-shaped cross-section.

7. A diffusion device according to claim 6 wherein the L-shaped member has a portion extending parallel to the supporting surface of the support means which is fastened to the support means.

8. A diffusion device according to claim 1 including a slip-resistant surface on at least one of the diffusor-supporting surface of the support means or the connecting means.

9. A diffusion device according to claim 8 wherein the slip-resistant surface comprises surface ribbing.

10. A diffusion device according to claim 1 including at least one strengthening member having a self-supporting profile arranged on a lower surface of the support means opposite to the diffusor-supporting surface.

11. A diffusion device according to claim 10 including at least one hold-down member having a self-supporting structure which extends adjacent to the diffusor means and is fastened to the strengthening member.

12. A diffusion device according to claim 10 wherein the strengthening member has an L-shaped cross-section.

13. A diffusion device according to claim 12 wherein the strengthening member has a portion which extends parallel to the lower surface of the support means and is fastened to the support means.

14. A diffusion device comprising support means having a diffusor-supporting surface, flexible sheet-like diffusor means positioned on the support means adjacent to the supporting surface, and connecting means providing a removable, gas-tight connection between the periphery of the diffusor means and the periphery of the support means and arranged so that the diffusor means may be supported by the diffusor-supporting surface of the support means in the absence of gas pressure tending to separate the diffusor means from the support means, wherein the connecting means comprises continuous resilient clamping and sealing means engaging peripheral regions of the diffusor means and the support means to resiliently retain them in gas-tight sealing engagement along the periphery of the diffusor means and diffusor-retaining means for retaining the diffusor means adjacent to the diffusor-supporting surface at a location within the region defined by the periphery of the diffusor means and the support means to inhibit excessive separation of the diffusor means from the diffusor-supporting surface, wherein the diffusor-retaining means comprises at least one hold-down member having a self-supporting structure and disposed adjacent to the surface of the diffusor means within the periphery of the device and the hold-down member has an L-shaped cross-section and the L-shaped member has a portion projecting perpendicularly away from the supporting surface of the support means with a middle section and end sections which are tapered from the middle section away from the supporting surface.

* * * * *